(12) United States Patent
Popovski

(10) Patent No.: US 6,764,245 B2
(45) Date of Patent: Jul. 20, 2004

(54) CONNECTING DEVICE FOR MODULAR FRAME CONSTRUCTION

(75) Inventor: George Ivanov Popovski, Bolton (CA)

(73) Assignee: Taylor Manufacturing Industries Inc., Brampton (CA)

(*) Notice: Subject to any disclaimer, the term of this patent is extended or adjusted under 35 U.S.C. 154(b) by 59 days.

(21) Appl. No.: 10/131,146

(22) Filed: Apr. 25, 2002

(65) Prior Publication Data

US 2003/0152422 A1 Aug. 14, 2003

(30) Foreign Application Priority Data

Feb. 14, 2002 (CA) .............................................. 2371667

(51) Int. Cl.⁷ .................................................. F16B 2/14
(52) U.S. Cl. .................................. 403/256; 403/374.2
(58) Field of Search ................................. 403/382, 403, 403/373, 374.1, 374.2, 374.3, 256, 257, 258, 260

(56) References Cited

U.S. PATENT DOCUMENTS

| | | | |
|---|---|---|---|
| 2,214,177 A | 9/1940 | Raybould | |
| 3,250,584 A | 5/1966 | Tassell | |
| 3,318,622 A | 5/1967 | Crumpler | |
| 3,332,182 A | 7/1967 | Mark | |
| 3,434,748 A | * 3/1969 | Leurent | ...................... 403/257 |
| 3,513,606 A | 5/1970 | Jones | |
| 3,537,736 A | 11/1970 | Kroopp | |
| 3,574,367 A | 4/1971 | Jankowski | |
| 3,672,710 A | 6/1972 | Kroopp | |
| 3,866,364 A | 2/1975 | Pollard | |
| 3,871,153 A | 3/1975 | Birum, Jr. | |
| 4,017,199 A | 4/1977 | Strassle | |
| 4,204,375 A | 5/1980 | Good | |
| 4,299,067 A | 11/1981 | Bertschi | |
| 4,333,284 A | 6/1982 | Meadows | |
| 4,490,064 A | 12/1984 | Ducharme | |
| 4,570,408 A | 2/1986 | Frascaroli et al. | |
| 4,756,639 A | 7/1988 | Hoshino | |
| 5,079,860 A | 1/1992 | Nugent | |
| 5,203,135 A | 4/1993 | Bastian | |
| 5,363,625 A | 11/1994 | Philippi | |
| 5,651,630 A | 7/1997 | Nomura | |
| 5,683,197 A | * 11/1997 | Pihl | ........................... 403/170 |
| 5,769,460 A | 6/1998 | Imai | |
| 5,809,709 A | 9/1998 | Ryan et al. | |
| 5,816,734 A | * 10/1998 | Wahlin | ........................ 403/362 |
| 5,823,704 A | 10/1998 | Koch et al. | |
| 6,032,433 A | 3/2000 | Hatziathanasiou | |
| 6,062,764 A | 5/2000 | Rixen et al. | |
| 6,185,887 B1 | 2/2001 | Strassle | |
| 6,203,239 B1 | 3/2001 | Mucciacciaro et al. | |

FOREIGN PATENT DOCUMENTS

| | | | |
|---|---|---|---|
| DE | 4244603 | * | 7/1994 |
| GB | 2277973 | * | 11/1994 |

* cited by examiner

Primary Examiner—Robert E. Pezzuto
Assistant Examiner—Nathan S Mammen
(74) Attorney, Agent, or Firm—Riches, McKenzie & Herbert LLP

(57) ABSTRACT

A connection device in which a hook member is carried in a casing member for both rotation about an axis of the hook member and movement longitudinally of the hook member inwardly and outwardly relative the casing. An actuating member is provided to displace the hook member simultaneously for rotation and axial movement. The connection device is particularly adapted to be used as an element of a releasable joint for modular frame construction of frame members having T-shaped longitudinally extending slots. With the hook member in an unlocked position, the hook member extends from one frame member carrying the hook member and permits passage into a slot of another frame member with the hook member in the slot in the unlocked position, the hook member may be moved to a locked position by rotation and withdrawal of the hook member relative the frame member by which it is carried so as to catch the head of the hook member in the T-shaped slot and draw the two frame members together.

20 Claims, 4 Drawing Sheets

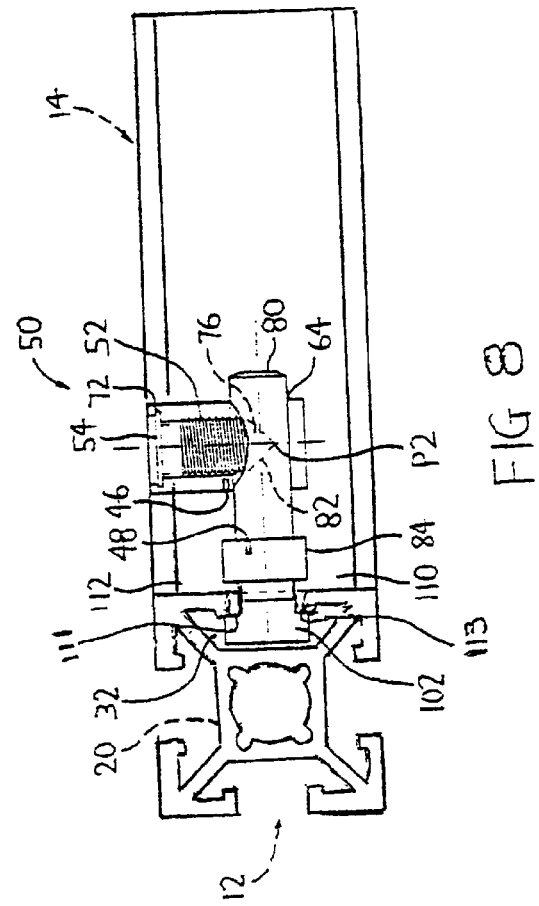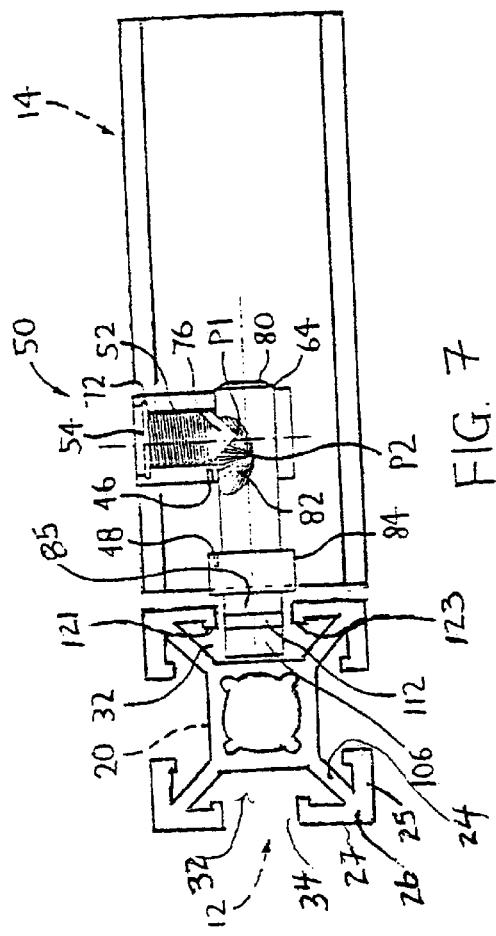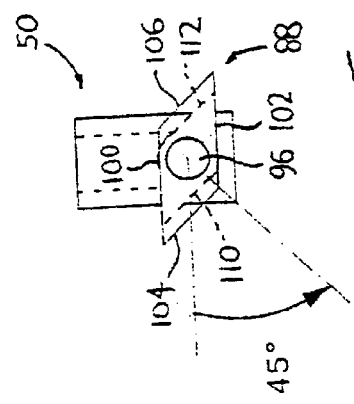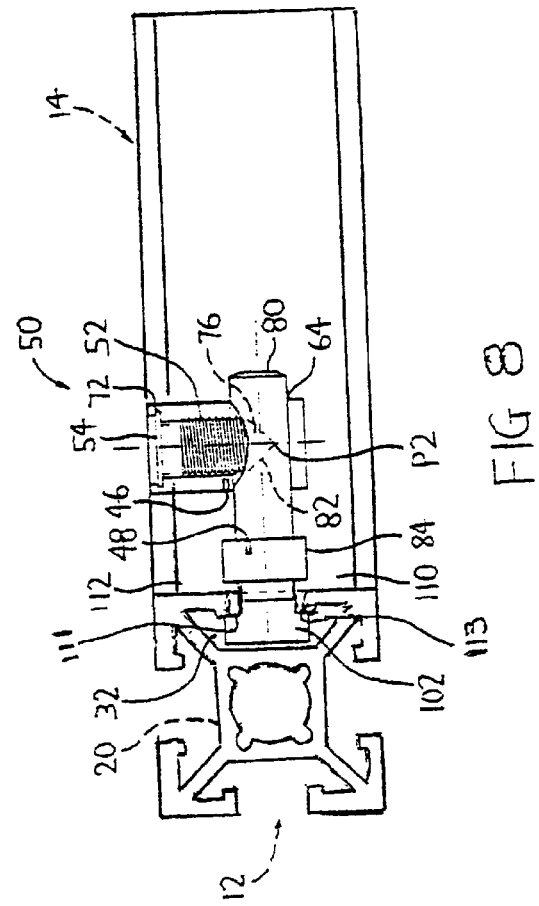

US 6,764,245 B2

CONNECTING DEVICE FOR MODULAR FRAME CONSTRUCTION

SCOPE OF THE INVENTION

The present invention relates to a connecting device and, in particular, to a connecting device for interconnecting frame members of a modular construction.

BACKGROUND OF THE INVENTION

Modular frame constructions are known which use extruded groove frame members to be interconnected via connection members received in T-shaped grooves in the faces of the frame members. Such frame members can be interconnected to form all manner of structures including showcases, bookcases, tables, display booths as well as one or two story offices, mezzanines and housing. Typical such frame members are disclosed in U.S. Pat. No. 3,513,606 to Jones, issued May 26, 1970 and in U.S. Pat. No. 4,490,064 to Ducharme, issued Dec. 25, 1984. The frame members have channels extending along their faces with T-shaped slots received in the faces and adapted to receive and secure fasteners behind shoulders formed in the T-shaped slots. A variety of coupling mechanisms are known. Ducharme teaches one known coupling mechanism which suffers, amongst other things, a disadvantage that the head of the fastener must be inserted into a channelway at the end of a frame member and slid longitudinally to a desired position.

U.S. Pat. No. 3,537,736 to Kroopp, issued Nov. 3, 1970 and U.S. Pat. No. 3,672,710 to Kroopp, issued Jun. 27, 1972 show mechanisms in which, amongst other things, the head of the fastener has a head with a T-shaped configuration and a different width in one direction than in another direction. Such fasteners are adapted to be inserted into the slot from the side of a frame member at any position along the frame where it may be desired to be coupled by orienting the head so that its width permits passage into the slot in the frame. After insertion, the fastener head is then rotated so that shoulders on the T-shaped head bears on shoulders in the T-shaped slot. Parallelogram shaped rotatable nuts and fasteners which can be inserted along the length of the frame members are known as shown, for example, in Jones as well as U.S. Pat. No. 3,250,584 to Tassell, issued May 10, 1966.

Coupling devices such as taught by Kroopp suffer the disadvantage that the coupling device must be manipulated by a user so as to rotate the coupling device from a lesser width position in which its T-shaped head may pass into the slot to a position in which a wider width engages shoulders within the slot. A disadvantage arises when attempting to either insert the coupling mechanism into the slot or to remove it, that it is necessary for some substantial manipulation to permit application and/or removal. Difficulties are particularly experienced during the step of removal. The present inventor has appreciated the disadvantage of having to determine the relative rotational position into which to rotate and manipulate one frame member in order to be able to couple or uncouple the same to another frame member. Manipulation may not be possible or at least may be difficult and can significantly increase the time required to apply or remove any frame member. As well, space constraints may be such that it will be very difficult to rotate or manipulate any frame member to be applied or removed.

SUMMARY OF THE INVENTION

To at least partially overcome these disadvantages of the prior art, the present invention provides a connecting device in which a T-headed bolt member is biased to assume a configuration in which it is ready for insertion into or removal from a T-shaped slot of a frame member and in which, by use of an activator in movement of the T-shaped bolt member to a locked position, the bolt member is automatically rotated to assume a position in which the head of T-shaped bolt engages shoulders of a T-shaped slot in the frame member.

It is an object of the present invention to provide a coupling mechanism which provides for a simpler coupling and uncoupling of frame members.

It is another object of the present invention to provide a connecting device in which a frame member does not need to be rotated or otherwise manipulated from a position it is desired to assume in order to permit coupling and uncoupling of the frame member.

It is another object to provide a connecting device for connecting frames having T-shaped slots in their faces in which a threaded set screw may be rotated and thereby a T-headed bolt is caused to be moved between an unlocked position in which the T-headed bolt is adapted to pass into or out of an opening to a shouldered T-shaped slot and a locked position in which the T-shaped bolt member is rotated such that within the T-shaped slot, it engages the shoulders of the slot and the T-shaped bolt member is drawn into engagement therewith.

Accordingly, in one aspect, the present invention provides a connection device comprising a hook member and a casing member, the hook member being elongated about an axis and having a slide portion on an inner end and a hook portion on an outer end, the casing member having a slide bore in which the slide portion of the hook member is slidably received for sliding inwardly and outwardly parallel the axis with the hook portion extending out of the slide bore and with the hook member rotatable relative the casing member about the axis, a spring coupled between the hook member and the casing member to bias the hook member axially outwardly from the slide bore and to bias the hook member to rotate in one direction relative the casing member about the axis, a camming recess in the slide portion opening radially of the axis and presenting a camming surface therein, the casing member having an actuator bore extending transverse to the slide bore from an outer open end into the slide bore, an actuator member displaceable within the actuator bore between an outer position and an inner position, the actuator member having a camming protuberance at its inner end for engaging the camming surface, wherein with the camming protuberance extending into the recess engagement between the camming surface and the camming protrusion prevents withdrawal of the hook member from the casing member and the spring biases the hook member to urge the camming surface into engagement with the camming protuberance which engagement determines the position of the hook member relative the casing member both axially and rotationally;

in moving the actuator member from the outer position towards the inner position, the camming protuberance cams on the camming surface against the bias of the spring to both draw the hook member axially inwardly into the casing member and rotate the hook member relative the casing member.

In another aspect, the present invention provides a releasable joint for modular frame construction comprising a first elongated frame member and a second frame member and a connection device for releasably securing the two frame members together, the first frame member having a T-shape slot extending longitudinally of the first frame member and defined by a channel opening at an external face of the first frame member of a constant width and by an inner chamber inward of the channel wider than the channel and defining internal chamber shoulder surfaces on each side of the channel, the second frame member having an external end face with a central slide bore extending into the second frame member open at the end face, the connection device including a hook member and a spring;

the hook member being elongated about an axis and having a slide portion on an inner end and a hook portion on an outer end, the hook portion having a head at the outer end of the hook member joined by a shank to a remainder of the hook member, the head as seen in a first longitudinal side view having a first width normal the axis of the hook member which is wider than a width of the shank in the first longitudinal side view so that the head presents head shoulder surfaces directed axially towards the inner end of the hook member, the head as seen in a second longitudinal side view having a second width normal the axis of the hook member which is less than the first width of the head, the first longitudinal side view and the second longitudinal side view are disposed relative to each other at a displacement angle about the axis of the hook member as seen in axial end view, the slide portion of the hook member longitudinally slidably received within the slide bore with the hook member rotatable about its axis relative the second frame member, the spring coupled between the second frame member and the hook member biasing the hook member longitudinally out of the slide bore and biasing the hook member to rotate in one direction about its axis relative the second frame member, a camming recess in the slide portion opening radially of the axis and presenting a camming surface therein, the second frame having an actuator bore extending transverse to the slide bore from an outer open end into the slide bore, an actuator member displaceable within the actuator bore between an outer position and an inner position, the actuator member having a camming protuberance at its inner end for engaging the camming surface, the camming protuberance extending into the recess so that engagement between the camming surface and the camming protrusion prevents withdrawal of the hook member from the casing member and the spring biases the hook member to urge the camming surface into engagement with the camming protuberance which engagement determines the position of the hook member relative the casing member both axially and rotationally;

in moving the actuator member from the outer position towards the inner position, the camming protuberance cams on the camming surface against the bias of the spring to both draw the hook member axially inwardly into the casing member and rotate the hook member relative the casing member through the displacement angle, the first width of the head being greater than the width of the channel, the second width of the head being less than the width of the channel, with the end face of the second frame member engaging the external face of the first frame member with the slide bore centered on the channel in an unlocked position, the actuator is in its outer position and the hook portion is in a rotational position which presents the second width of the head disposed so that the hook portion passes through the channel and the hook portion extends from the slide bore sufficiently that the head shoulder surfaces of the hook portion are in the inner chamber inward of the chamber shoulder surfaces and from which unlocked position on movement of the actuator member to the inner position, the hook portion is rotated through said displacement angle to a position which presents the first width of the head disposed so that the head does not pass through the channel, drawing the hook member axially into the slide bore to engage the head shoulder surfaces with the chamber shoulder surfaces and draw the external face of the first frame member into a frictional engagement with the end face of the second frame member.

The present invention provides a connection device in which a hook member is carried in a casing member for both rotation about an axis of the hook member and movement longitudinally of the hook member inwardly and outwardly relative the casing. An actuating member is provided to displace the hook member simultaneously for rotation and axial movement. The connection device is particularly adapted to be used as an element of a releasable joint for modular frame construction of frame members having T-shaped longitudinally extending slots. With the hook member in an unlocked position, the hook member extends from one frame member carrying the hook member and permits passage into a slot of another frame member. With the hook member in the slot in the unlocked position, the hook member may be moved to a locked position by rotation and withdrawal of the hook member relative the frame member by which it is carried so as to catch the head of the hook member in the T-shaped slot and draw the two frame members together. The hook member in the unlocked position preferably is orientated relative the frame member which carries the hook member in an orientation such that alignment of features of the frame member carrying the hook member with features of the other frame member places the frame members so that the hook member is aligned to be moved into and out of the T-shaped slot.

BRIEF DESCRIPTION OF THE DRAWINGS

Further aspects and advantages of the present invention will become apparent from the following description taken together with the accompanying drawings in which:

FIG. 5 is an end view of the unlocked connecting device of FIG. 3;

FIG. 6 is an end view of the locked connecting device of FIG. 4;

FIG. 7 is a schematic cross-sectional side view showing the frame members of FIG. 2 as cross-sectioned along section line 7–7' in FIG. 2, however, with the connecting member in an unlocked position as shown in FIG. 3; and FIG. 8 is a schematic cross-sectional side view showing the frame members of FIG. 2 as cross-sectioned along section line 7–7' in FIG. 2 and with the connecting member in a locked position as shown in FIG. 4.

DETAILED DESCRIPTION OF THE DRAWINGS

Figure 1:
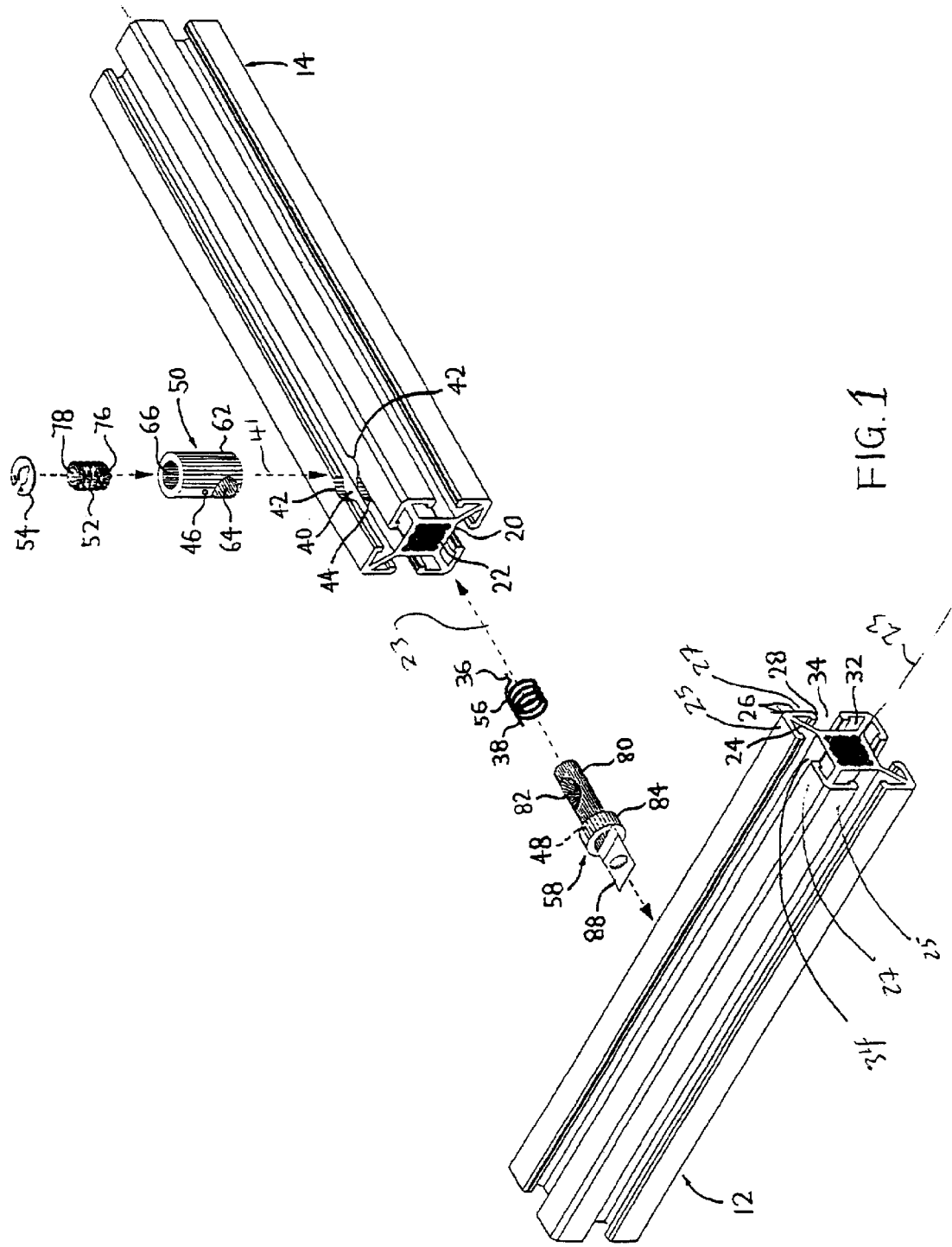
FIG. 1 is an exploded pictorial view of two frame members and a connecting device.

Reference is now made in detail to the drawings in which like reference numerals represent like parts throughout the several views.

Referring first to FIG. 1, FIG. 1 shows two frame members being a first frame member 12 and a second frame member 14. The frame members are preferably aluminum and formed by an extrusion process. For convenience, both frame members 12 and 14 are shown as having an identical cross-section. Each of the frames 12 and 14 has an elongated square inner tube 20 forming an elongated center bore 22 extending longitudinally through each frame. From each corner of the square inner tube, a diagonal flange 24 extends diagonally outwardly merging into the center of a V-shaped corner flange 26 which has two plates 25 and 27 disposed at right angles to each other and forming at their juncture an outside corner of the frame member. The plates 25 and 27 have planar outside surfaces which form the outside faces of the frame member. As can be seen, each of the outside faces of the frame members are formed by the pair of plates 25 and 27 spaced from each other by a channel 34 of constant width. As seen in end view, each of the frame members has a T-shaped slot 32 extending longitudinally therethrough defined between adjacent of the diagonal flanges 24 and the plates 25 and 27 on either side of the channel 34.

The elongated bore 22 extends centrally through the frame members 12 and 14 about a longitudinal central axis 23 of each.

The second frame member 14 has an aperture 40 extending into the frame member transverse to its axis 23 from an opening in one external face. The aperture 40 extends into the bore 22. The aperture 40 is coaxially disposed about a transverse axis 41 which intersects with the axis 23 of the bore 22. The aperture 40 is circular and since it extends centrally through the channel 34 and in the preferred embodiment has a diameter greater than the spacing between the plates 25 and 27, two opposite cut-out portions 42 are formed in the edges of the plates 25 and 27. As well, a circular opening 44 extends through an upper wall of the square inner tube 20.

Figure 3:
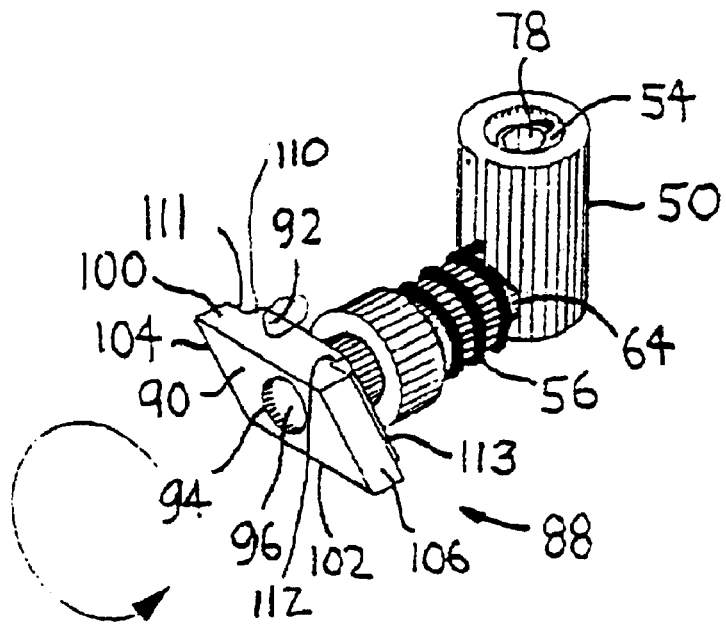
FIG. 3 is a perspective view of the connecting device of FIG. 1 as it would appear assembled and in an unlocked position within its frame member, however, with the frame member not shown.
Figure 4:
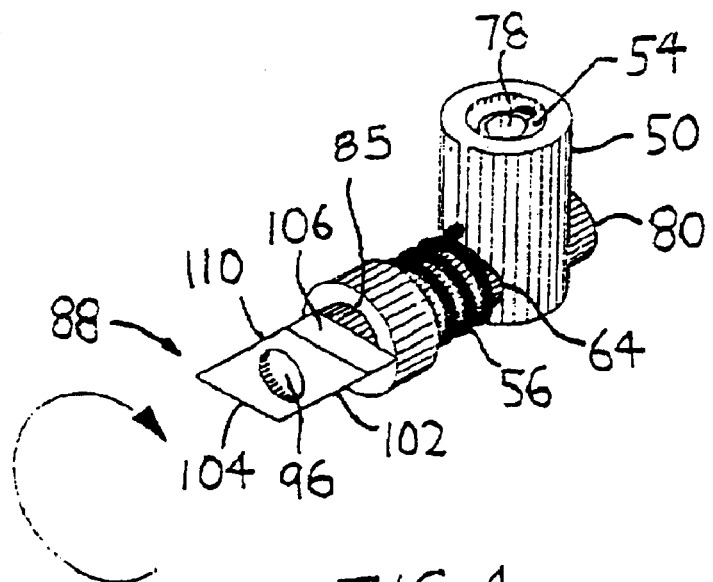
FIG. 4 is a perspective view similar to that of FIG. 3 but of the connecting device in an assembled locked position.

Reference is made to FIG. 3 which shows a pictorial view of a connecting device 10 in accordance with the preferred embodiment of this invention. The components of the connecting device 10 are illustrated in exploded view in FIG. 1 and the connecting device 10 is to be coupled together whereby it becomes secured to the second frame member 14. The connecting device 10 is formed from five main components, namely, a T-bolt 58, a spring 56, a lock bushing 50, an activator-like set screw 52 and a retaining ring 54.

The lock bushing 50 comprises a cylindrical tube 62 which is adapted to be secured to the second frame member 14 in a friction fit in the aperture 40. In this regard, the aperture 40 extends merely through the upper side of the square inner tube 20. The lock bushing 50 is inserted into the aperture 40 and its lower axial end abuts on and engages the inside surface of a lower wall of the square inner tube 20. The lock bushing 50 is of an axial length such that when the lock bushing 50 is fully inserted into the aperture 40, an upper outer end of the lock bushing 50 is within the confines of the frame member 14, preferably lying flush with the outer faces of the plates 25 and 27 as seen in FIG. 5. The lock bushing 50 may be seen to be cylindrical about an axis which, when the lock bushing 50 is inserted into the aperture 40, is coaxial with the axis 41 of the aperture 40. The lock bushing 50 is provided with a cylindrical transverse slide bore 64 at a lower end of the lock bushing 50 which transverse slide bore 64 is normal to the axis 41. The transverse slide bore 64 is provided at a location on the lock bushing 50 such that when the lock bushing 50 is fully inserted into the aperture 40, the transverse slide bore 64 is coaxially aligned with the axis 23 of the elongate bore 22 passing through the square inner tube 20 of the frame member 14.

The cylindrical tube 62 of the lock bushing 50 has a cylindrical activator bore 66 extending longitudinally therethrough which is open at an outer end of the lock bushing and extends inwardly to communicate with the transverse slide bore 64. An inner wall of the activator bore 66 is threaded and adapted to threadably receive the set screw 52 therein. An annular groove 74 is provided extending into the inner wall of the activator bore 66 proximate the outer end of the lock bushing. This groove 74 is adapted to receive the retaining ring 54 which serves the purpose of retaining the set screw 52 within the activator bore 66 against removal. After the set screw 52 is inserted into the bore 66, the retaining ring 54 is inserted into the annular groove 74 and the retaining ring 54 then functions to prevent the set screw 52 from being withdrawn outwardly past the retaining ring 54.

The set screw 52 has at its inner end a protruding conical inner end terminating at a tip 76. The set screw 52 has at its outer end a hexagonal driver recess 78 which recess 78 is adapted to receive a conventional tool to permit rotation of the set screw to move the set screw axially within the activator bore 66.

Figure 2:
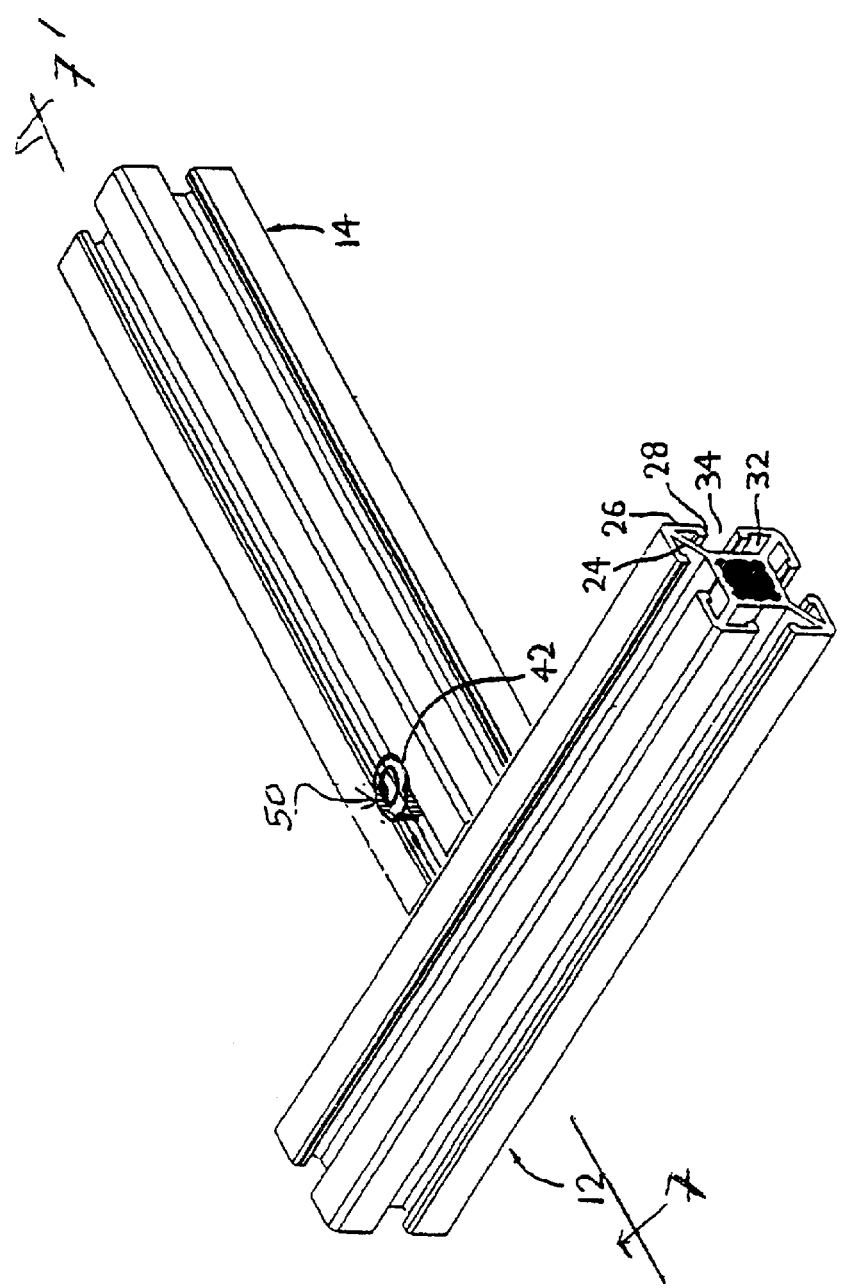
FIG. 2 is a pictorial view of the two frame members of FIG. 1 coupled together in a locked position by the coupling device.

As shown in FIG. 2, the T-bolt 58 is inserted coaxially into the bore 22 within the square inner tube 20 from one end of the frame 14 into engagement with the lock bushing 50. The T-bolt 58 has a cylindrical rod-like slide portion 80 about an axis whose inner end is adapted to be slidably received in the slide bore 64 of the lock bushing 50. A conical camming recess 82 is provided on the slide portion 80 to receive and engage the tip 76 of the set screw 52. After insertion of the slide portion 80 into the slide bore 64 of the lock bushing, with the recess 82 disposed open to the activator bore 66, the set screw 52 may be threaded from a position with the tip 76 of the set screw outwardly of the bore 64 inwardly to a position in which the tip extends into the bore 64 and into the recess 82 in the slide portion 80. Once the tip 76 of the set screw extends into the recess 82, removal of the T-bolt is prevented by the tip 76 of the set screw engaging the surface of the walls of the recess 82. After the set screw 52 is threaded inwardly to a position in which the tip extends into the recess 82, the retaining ring 54 is then inserted into the activator bore.

The retaining ring 54 is preferably located in the activator bore 66 at a position that the retaining ring retains the set screw against removal outwardly beyond a position in which the tip of the set screw necessarily extends into the recess 82 and prevents the T-bolt from being removed from the slide bore 64.

The T-bolt may best be seen in side view in FIGS. 7 and 8 as including the cylindrical slide portion 80 at its innermost end, a hook portion including a T-shaped locking head 88 at its outer end and a cylindrical annular ring guide 84 in between.

The cylindrical annular ring guide 84 is provided on the T-bolt 58 outwardly of the slide portion 80. The diameter of the annular ring guide 84 is selected in the preferred embodiment so that the annular ring guide 84 is received within the square inner bore 22 preferably engaging with the inner surfaces of the walls of the bore 22 to slide and rotate coaxially therein with a longitudinal axis of the T-bolt 58 coaxial within the slide portion 80 being disposed coaxial within the bore 22 and, as well, coaxial within the slide bore 64 of the lock bushing 50.

The spring 56 is a helical coil spring having an inner end 36 and outer end 38, each bent to extend axially away from the coils of the spring. The spring 56 is mounted about the slide portion 80 with the slide portion 80 to pass axially through the coils of the spring 56. An axially extending opening 46 is provided extending axially into the lock bushing 50 proximate the slide bore 64 which opening 46 is to receive the axially extending inner end 36 of the spring. Similarly, an axially extending opening 47 is provided extending axially into an axially inwardly directed shoulder surface 83 of the annular ring guide 84 which opening 47 is to receive the axially extending outer end 38 of the spring.

The spring 56 biases the T-bolt 58 axially away from the lock bushing 50. In an assembled condition with the tip 76 of the set screw 52 received in the recess 82 so as to prevent removal of the T-bolt 58 from the lock bushing 50, the coils of the spring 56 are axially compressed such that the spring 56 biases the T-bolt 58 axially outwardly, that is, away from the lock bushing 50. Axial sliding movement of the T-bolt 58 axially inwardly into the slide bore 64 is permitted against the bias of the spring 56.

The spring 56 biases the T-bolt for rotation about the axis of the slide bore 64 of the lock bushing 50 towards an unbiased position. The spring 56 in an unbiased position has its ends 36 and 38 located at relative rotational positions relative to each other. On rotation from the unbiased position, the spring 56 will bias the T-bolt 58 to rotate about its axis towards the unbiased position.

The T-bolt 58 has, as a hook portion, a T-shaped locking head 88 provided at the outer end of the T-bolt fixedly secured to the remainder of the T-bolt and spaced outwardly of the annular ring guide 84 via a short cylindrical spacer rod shank portion 85. The locking head 88, as seen in end view in FIGS. 5 and 6, is in the form of a parallelogram with two longer parallel opposite sides 100 and 102 and two shorter parallel opposite sides 104 and 106. Each of the sides 100, 102, 104 and 106 are disposed in a respective plane which is parallel the longitudinal axis of the T-bolt 58.

As best seen in a longitudinal side view in FIG. 7 showing an unlocked configuration, each of the sides 100 and 102 are spaced a distance from each other less than the distance between the plates 25 and 27, that is, the head 88 has a short width between the sides 100 and 102 which is less than the width of the channel 34. As seen in FIG. 7, the short width of the head 88 is the same as that of the shank portion 85. In the unlocked position as seen in FIG. 7, the sides 100 and 102 extend transverse to the axis of the T-bolt in a direction which is parallel to both the upper face of the second frame member 14 and the longitudinal axis of the first frame member 12. With the second frame member 14 having the T-bolt held in the position as shown in FIG. 7, the second frame member 14 can be moved from the position shown in FIG. 7 in a direction parallel the longitudinal axis of the second frame member 14 to the left or the right relative the first frame member 12 and, in such movement, the head of the T-bolt will pass freely into or out of the channel 34 and, hence, into or out of the T-shaped slot 32 in the first frame 12.

As best seen in a longitudinal side view in FIG. 8 showing a locked configuration, each of the sides 104 and 106 are spaced a distance from each other greater than the distance between the plates 25 and 27, that is, the head 88 has a longer width between the sides 104 and 106 which is greater than the width of the channel 34. As seen in FIG. 8, the longer width of the head 88 is greater than the width of the shank portion 85. Thus, with the locking head 88 in the relative rotational position as illustrated in the locked position as shown in FIGS. 6 and 8, shoulder portions of the locking head 88 carrying axially directed head shoulder surfaces 111 and 113 adjacent the sides 104 and 106 are disposed in the T-shaped slot 32 of the first frame member inward of and behind the plates 25 and 27 for engagement with chamber shoulder surfaces 121 and 123 on the plates and prevent the T-bolt 58 from being withdrawn from the T-shaped slot 32 by movement to the right parallel the longitudinal axis of the second frame member 14.

As best seen in FIGS. 3 and 8, the axially directed surfaces of the locking head 88, have a stepped configuration with a lesser width inner portion 92 defined between the opposite sides 100 and 102 and two opposite sides 110 and 112. The sides 110 and 112 extend in planes parallel to the sides 104 and 106, however, spaced inwardly from sides 104 and 106 by the head shoulder surfaces 111 and 113 such that the sides 110 and 112 are spaced a distance apart less than the distance the plates 25 and 27 are spaced. The sides 110 and 112 each end at the axially directed head shoulder surfaces 111 and 113. As seen in FIG. 8, when the T-bolt 58 is drawn towards the right to engage the plates 25 and 27, the inner portion 92 defined between the sides 110 and 112 becomes disposed in the channel 34 between the plates 25 and 27 with the sides 110 and 112 in opposed relation to edges of the plates 25 and 27. While the sides 110 and 112 are received between the plates 25 and 27, engagement between the sides 110 and 112 and the edges of the plates 25 and 27 prevent pivoting of the T-bolt 58 about its axis relative the first frame member 12 so as to thereby assist in preventing the T-bolt 58 from becoming disengaged from the T-shaped slot 32.

The connecting device 10 is adapted to be carried by the second frame member 14 so as to permit the frame member 14 to be coupled to any other devices which carry T-shaped channels such as the first frame member 12.

The connecting device 10 is assembled within second frame member 14 in a manner which retains the connecting device within the second frame member 14. The lock bushing 50 is inserted into the aperture 40 and orientated so that its slide bore 64 is coaxial to the bore 22. The spring 56 is mounted on the T-bolt 58 with the coils of the spring about the slide portion 80 and the outer end 38 of the spring received in the opening 47 in the annular guide 84. The T-bolt 58 carrying the spring 56 is then inserted into bore 22 so that the slide portion 80 becomes received within the slide bore 64 of the lock bushing 50. The T-bolt 58 is rotated to a position that the inner end 36 of the spring 56 aligns with the opening 46 in the lock bushing and the T-bolt 58 is urged inwardly to extend the inner end 36 of the spring 56 into the opening 46. Next, the T-bolt 58 is urged axially inwardly and rotated, against the bias of the spring 56, to a position in which the recess 82 of the slide portion 80 is open to the actuator bore 66. In this position, the set screw 52 is threaded into the actuator bore 66 so as to have its tip 76 extend into the slide bore 64 and into the recess 82. Once the tip of the set screw 52 is inside the recess 82, the engagement of the set screw on the surfaces of the recess 82 prevents the T-bolt from being withdrawn from the lock bushing 50. The retaining ring 54 is then inserted into the groove 74 in the actuator bore 66 so as to prevent the set screw from being withdrawn.

With the tip 76 of the set screw 52 extending into the slide bore 64 and inside the recess 82, the T-bolt 58 is coupled to the second frame member 14 against removal. The locking ring 54 is located in groove 74 in the bore 60 at a position that when the set screw is threaded to move outwardly, the outward movement of the set screw is stopped by engagement with the retaining ring at a position as shown in FIG. 7 that the tip 76 of the set screw 52 continues to extend into the bore and into the recess 82 sufficiently to prevent withdrawal of the slide portion 80 from the lock bushing 50.

The ability of the T-bolt 58 to move relative the frame 14 is determined by the camming contact of the tip 76 of the set screw with the surfaces of the recess 82.

In the embodiment illustrated and particularly as shown in FIGS. 5 and 6, the spring 56 biases the T-bolt 58 to rotate clockwise relative the lock bushing 50. The bias of the spring 56 in rotating the T-bolt clockwise urges the bolt to assume the position shown in FIG. 5.

As well, the spring 56 biases the T-bolt to slide axially away from the lock bushing 50 and, thus, towards the right as seen in FIG. 7. Such axial sliding of the T-bolt is limited in FIG. 7 by the engagement of the tip 76 of the set screw on the surface of the recess 82.

The connecting device can be moved from the unlocked position of FIG. 5 to the locked position of FIG. 6 by rotating the set screw 52 to move from a withdrawn position shown in FIG. 7 to a fully extended position shown in FIG. 8. As the tip 76 of the set screw moves inwardly in the actuating bore 66, it engages with the camming surface of the recess 82 and cams the T-bolt to both rotate counterclockwise and slide axially inwardly towards a position in which an axis of the set screw and an axis about which the conical recess 82 are coaxial as seen in FIG. 8. FIG. 7 shows a locked position in which the conical tip 76 is fully seated within the apex of the conical recess 82. It is to be appreciated, however, that locking of the two frame members together with the T-bolt 58 may be achieved on rotating the set screw inwardly before the set screw achieves the fully seated position as shown in FIG. 8.

By rotating the set screw 52 to withdraw the set screw, on withdrawal of the set screw, the bias of the spring will urge the T-bolt 58 to both rotate clockwise and slide axially outwardly.

The relative stroke of the T-bolt 58 in sliding axially outwardly is to be selected such that the locking head 88 can move sufficiently into the T-shaped slot 32 that the head 88 and its head shoulder surfaces 111 and 113 are rearward of the plates 25 and 27 such that on subsequent relative rotation of the locking head 88, the head shoulder surfaces 111 and 113 of the locking head come to be engaged on chamber shoulder surfaces 121 and 123 the plates 25 and 27.

Preferably, in a fully locked position, the camming engagement between the set screw 52 and the recess 82 draws head shoulder surfaces 111 and 113 of the locking head 88 into the chamber shoulder surfaces 121 and 123 of the plates 25 and 27 so as to urge the face of the first frame member 12 under considerable forces into the end of the second frame member 14.

With the T-bolt 58 in an unlocked position, a user may locate the second frame member 14 relative the first frame member 12 in an orientation that an upper face of the second frame member 14 is flush with the upper face of the first frame 12 and it will result that the T-bolt head is oriented in a position that it will pass through the channel 34 between the plates 25 and 27. Thus, for example, in the context of two identical frame members 12 and 14 as particularly shown in FIGS. 1, 2, 7 and 8, while maintaining the second frame member 14 positioned so that its upper face is in the same plane as the upper face of the first frame member 12, the frame members may be moved relative to each other since with the set screw in the withdrawn position, the T-bolt head will be orientated so as to permit the T-bolt head to pass between the plates 25 and 27 and through the channel 34 and into the T-shaped slot 32. As well, it is to be appreciated that from a coupled configuration as shown in FIG. 2, while maintaining the upper faces of the frame members in the same plane, on a user moving the set screw to the withdrawn position, the T-bolt head will come to assume an unlocked orientation in which the surfaces 100 and 102 extend parallel the channel 34 between the plates 25 and 27 and the user can easily manipulate the frame members while maintaining the upper faces of the frame members in the same plane, to remove the locking head through the channel 34 between the plates 25 and 27.

In use, with the coupling mechanism in the unlocked position as best seen in FIG. 7 having the set screw in a withdrawn position in the actuator bore 66, a user may manipulate the second frame member 14 so as to locate the locking head 88 inside the T-shaped channel 32 of the first frame member 12. With the locking head 88 inside the first frame member 12, a user, with a tool, rotates the set screw 52 so as to advance it to an extended position and move the T-bolt from the unlocked position shown in FIG. 7 to the locked position shown in FIG. 8 rotating the T-bolt 58 and drawing it axially inwardly into the second frame member 14. In the locked position as shown in FIG. 8, the second frame member 14 is securely fixed and locked to the first frame member 12.

To disengage the frames, it is merely necessary for a user to use the tool to rotate the set screw to move it to the extended position to have the connecting device adopt the unlocked position. With withdrawal of the set screw, the T-bolt member under the bias of the spring rotates and extends axially outwardly relative the second frame member 14. In the unlocked position, the second frame member 14 can readily be uncoupled from the first frame member 12 maintaining an orientation with the upper surfaces of the frame members flush.

Preferably, in accordance with the preferred embodiment, when the set screw is withdrawn to the position where it engages the retaining ring, the T-bolt head is orientated into a position in which its surfaces 100 and 102 extend parallel the upper face of the second frame member 14. By having the hook member assume a predetermined orientation relative the second frame member when in an unlocked position, a user with knowledge of the relative orientation between the T-bolt head and the second frame member can then suitably manipulate the second frame member for coupling or uncoupling with the first frame member.

The present invention has been described with reference to securing two identical frames 12 and 14 together. It is to be appreciated that the connecting device may be suitable for coupling any member carrying the connecting device to another member which has a shouldered recess complementary in shape and size to the shape and size of the locking head 88. Such T-shaped recesses can be provided as shown in the Figures as a slot 32 along the length of an extruded frame such as member 12 or could be provided merely at one location as in the case of, for example, a customized decorative ball or end plate or other member.

The engagement of the tip 76 of the set screw 52 and the surface of the recess 82 will, amongst other things, determine the extent to which a camming action moves the T-bolt against the bias of the spring. The recess 82 is preferably conical as may be manufactured by drilling the recess with a drill having a conical cutting face. It is to be appreciated that the recess 82 need not be symmetrical nor conical and can be particularly machined as may be advantageous to provide for favourable camming with engagement by the set screw. For example, the recess 82 could be an elongate raceway-like slot which is of increasing depth from a cylindrical surface of the slide portion 80 from one end to another and with the raceway extending along the surface of the slide portion as a segment of a helix or other curve or L-shape. The raceway could have a conical shape in cross-section of the same angle cone as the set screw. Similarly, the set screw is shown as having a conical point as is believed to be advantageous, preferably, with the conical point being symmetrical about the axis of the set screw. The surface of the tip need not be frustoconical and could, for example, be a rounded protuberance or merely provide a relatively narrow point of contact. As well, while less preferred, it is possible that the point of contact could be asymmetrical relative the axis of the set screw.

In the preferred embodiment, a single spring 56 is used to provide for biasing of the T-bolt member to both rotate and slide axially. It is to be appreciated that other spring arrangements could be provided as with one spring to provide for rotation and a separate spring to provide for axial sliding.

The spring 56 biases the hook member for axial sliding and for rotation. The combined biasing effect determines the point of contact of the surface of the recess 82 in the tip 76, and a person skilled in the art will need to consider the relative biasing forces required for axial sliding compared to that for rotation.

The preferred embodiment illustrated shows the preferred use of a lock bushing 50 as a separate element. It is to be appreciated, however, that the lock bushing 50 is not necessary. The T-bolt could be provided to merely be journalled by contact within side surfaces of the bore 20 and the set screw could be threadably engaged by providing threading on edges of the plates 25 and 27 and the side wall of the square inner box 22 about the aperture 40.

It is appreciated that the retaining ring 54 is not necessary, however, is a preferred feature as, for example, to prevent withdrawal of the set screw to an extent that the T-bolt member becomes disengaged. Other mechanisms could be provided to maintain the T-bolt member against removal.

The T-bolt is shown in the preferred embodiment as having as a hook portion, a T-shaped locking head 88 adapted to be received in a complementary T-shaped slot 32. It is appreciated that other shapes of hook portions could be adapted to slide axially and rotate about their axis for complementary coupling with other slots, channels, latches, catches, shoulders, eyelets and the like for coupling.

While the invention has been described with reference to preferred embodiments, the invention is not so limited. Many modifications and variations will now occur to persons skilled in the art. For a definition of the invention, reference is made to the appended claims.

I claim:

1. A connection device comprising a hook member and a casing member, the hook member being elongated about an axis and having a slide portion on an inner end and a hook portion on an outer end, the casing member having a slide bore in which the slide portion of the hook member is slidably received for sliding inwardly and outwardly parallel the axis with the hook portion extending out of the slide bore and with the hook member rotatable relative the casing member about the axis, a spring coupled between the hook member and the casing member to bias the hook member axially outwardly from the slide bore and to bias the hook member to rotate in one direction relative the casing member about the axis, a camming recess in the slide portion opening radially of the axis and presenting a camming surface therein, the casing member having an actuator bore extending transverse to the slide bore from an outer open end into the slide bore, an actuator member displaceable within the actuator bore between an outer position and an inner position, the actuator member having a camming protuberance at its inner end for engaging the camming surface, wherein with the camming protuberance extending into the recess engagement between the camming surface and the camming protrusion prevents withdrawal of the hook member from the casing member and the spring biases the hook member to urge the camming surface into engagement with the camming protuberance which engagement determines the position of the hook member relative the casing member both axially and rotationally, in moving the actuator member from the outer position towards the inner position, the camming protuberance cams on the camming surface against the bias of the spring to both draw the hook member axially inwardly into the casing member and rotate the hook member relative the casing member.

2. A connection device as claimed in claim 1 wherein the casing member comprises a cylindrical tubular member having a central opening forming the actuator bore and with the slide bore extending radially through the tubular member.

3. A connection device as claimed in claim 1 wherein the actuator member is threadably engaged within the actuator bore, an outer end of the actuator member is accessible through the outer open end of the actuator bore for rotation of the actuator member to move the actuator member between the inner and outer positions.

4. A connection device as claimed in claim 3 wherein a retaining member is provided limiting movement of the actuator member outwardly beyond the outer position.

5. A connection device as claimed in claim 4 wherein the retaining member comprises a resilient retaining split ring disposed within an annular groove inside the actuator bore.

6. A connection device as claimed in claim 1 wherein the camming surface comprises a conical surface.

7. A connection device as claimed in claim 6 wherein the conical surface is disposed about a cone axis normal the axis of the hook member.

8. A connection device as claimed in claim 1 in which the spring member comprises a helical spring extending coaxially about the hook member.

9. A connection device as claimed in claim 1 wherein the hook portion having a head at the outer end of the hook member joined by a shank to a remainder of the hook member,
- the head as seen in a first longitudinal side view having a first width normal the axis of the hook member which is wider than a width of the shank in the first longitudinal side view so that the head presents head shoulder surfaces directed axially towards the inner end of the hook member,
- the head as seen in a second longitudinal side view having a second width normal the axis of the hook member which is less than the first width of the head.

10. A connection device as claimed in claim 9 wherein the first longitudinal side view and the second longitudinal side view are disposed relative to each other at a displacement angle about the axis of the hook member as seen in axial end view of between 30° and 9°.

11. A connection device as claimed in claim 10 where said angle is 45°.

12. A connection device as claimed in claim 10 wherein the head as seen in axial end view is substantially a parallelgram.

13. A connection device as claimed in claim 10 wherein in moving the actuator member from the outer position towards the inner position, the camming protuberance cams on the camming surface against the bias of the spring to rotate the hook member relative the casing member about the axis through an angle approximately equal to the displacement angle.

14. A connection device comprising a hook member and a casing member,
- the hook member being elongated about an axis and having a slide portion on an inner end and a hook portion on an outer end,
- the casing member having a slide bore in which the slide portion of the hook member is slidably received for sliding inwardly and outwardly parallel the axis with the hook portion extending out of the slide bore and with the hook member rotatable relative the casing member about the axis,
- a spring coupled between the hook member and the casing member to bias the hook member axially outwardly from the slide bore and to bias the hook member to rotate in one direction relative the casing member about the axis,
- a camming recess in the slide portion opening radially of the axis and presenting a camming surface therein,
- the casing member having an actuator bore extending transverse to the slide bore from an outer open end into the slide bore,
- an actuator member displaceable within the actuator bore between an outer position and an inner position,
- the actuator member having a camming protuberance at its inner end for engaging the camming surface,
- wherein with the camming protuberance extending into the recess engagement between the camming surface and the camming protrusion prevents withdrawal of the hook member from the casing member and the spring biases the hook member to urge the camming surface into engagement with the camming protuberance which engagement determines the position of the hook member relative the casing member both axially and rotationally,
- in moving the actuator member from the outer position towards the inner position, the camming protuberance cams on the camming surface against the bias of the spring to both draw the hook member axially inwardly into the casing member and rotate the hook member relative the casing member,
- the spring member comprises a helical spring extending coaxially about the hook member,
- the hook member includes an annular ring intermediate the hook portion and the slide portion,
- the annular ring extending radially outwardly beyond the slide portion and presenting an axially inwardly directed shoulder surface,
- the spring having an outer end secured to the shoulder surface of the annular ring and an inner end secured to the casing member to bias the shoulder surface away from the casing member and to resist rotation of the hook member relative the casing member.

15. A releasable joint for modular frame construction comprising a first elongated frame member and a second frame member and a connection device for releasably securing the two frame members together,
- the first frame member having a T-shape slot extending longitudinally of the first frame member and defined by a channel opening at an external face of the first frame member of a constant width and by an inner chamber inward of the channel wider than the channel and defining internal chamber shoulder surfaces on each side of the channel,
- the second frame member having an external end face with a central slide bore extending into the second frame member open at the end face,
- the connection device including a hook member and a spring,
- the hook member being elongated about an axis and having a slide portion on an inner end and a hook portion on an outer end, the hook portion having a head at the outer end of the hook member joined by a shank to a remainder of the hook member,
- the head as seen in a first longitudinal side view having a first width normal the axis of the hook member which is wider than a width of the shank in the first longitudinal side view so that the head presents head shoulder surfaces directed axially towards the inner end of the hook member,
- the head as seen in a second longitudinal side view having a second width normal the axis of the hook member which is less than the first width of the head,
- the first longitudinal side view and the second longitudinal side view are disposed relative to each other at a displacement angle about the axis of the hook member as seen in axial end view,
- the slide portion of the hook member longitudinally slidably received within the slide bore with the hook member rotatable about its axis relative the second frame member,
- the spring coupled between the second frame member and the hook member biasing the hook member longitudinally out of the slide bore and biasing the hook member to rotate in one direction about its axis relative the second frame member,
- a camming recess in the slide portion opening radially of the axis and presenting a camming surface therein,
- the second frame having an actuator bore extending transverse to the slide bore from an outer open end into the slide bore, an actuator member displaceable within the actuator bore between an outer position and an inner position, the actuator member having a camming protuberance at its inner end for engaging the camming surface, the camming protuberance extending into the recess so that engagement between the camming surface and the camming protrusion prevents withdrawal of the hook member from the casing member and the spring biases the hook member to urge the camming surface into engagement with the camming protuberance which engagement determines the position of the hook member relative the casing member both axially and rotationally, in moving the actuator member from the outer position towards the inner position, the camming protuberance cams on the camming surface against the bias of the spring to both draw the hook member axially inwardly into the casing member and rotate the hook member relative the casing member through the displacement angle, the first width of the head being greater than the width of the channel, the second width of the head being less than the width of the channel, with the end face of the second frame member engaging the external face of the first frame member with the slide bore centered on the channel in an unlocked position, the actuator is in its outer position and the hook portion is in a rotational position which presents the second width of the head disposed so that the hook portion passes through the channel and the hook portion extends from the slide bore sufficiently that the head shoulder surfaces of the hook portion are in the inner chamber inward of the chamber shoulder surfaces and from which unlocked position on movement of the actuator member to the inner position, the hook portion is rotated through said displacement angle to a position which presents the first width of the head disposed so that the head does not pass through the channel and the hook member is drawn axially into the slide bore to engage the head shoulder surfaces with the chamber shoulder surfaces drawing the external face of the first frame member into a frictional engagement with the end face of the second frame member.

16. A device for connecting a first and a second elongated frame members in a perpendicular relationship relative to each other, said device comprising:

(a) a first connecting member being transversely housed within said first frame member at one end thereof and having a transverse bore;

(b) a second connecting member being housed within a longitudinal central bore of said first frame member at said one end thereof and being slidably and rotatably received within said transverse bore of said first connecting member;

(c) a rotatable locking head being attached to an end of said second connecting member which extends outwardly from said one end of said first frame member, said locking head being adapted to rotate and engage within an elongated groove formed along one side of said second frame member;

(d) a spring for biasing axial and rotating movement of said second connecting member relative to said first connecting member; and (e) a set screw threadably received in said first connecting member and having a conical tip for urging against a conical shaped recess provided on said spring biased second connecting member which is adapted to slide and rotate between an off-center position where said conical tip is off-center relative to a center of said conical shaped recess and a center position where said conical tip is at the center of said conical shaped recess;

(f) whereby turning said set screw in one direction urges said spring biased second connecting member to slide and rotate axially within said transverse bore towards one direction until said rotatable locking head tightly engaged with said second frame member thereby connecting and locking said first and second frame members, and turning said set screw in the other direction urges said spring biased second connecting member to slide and rotate axially within said transverse bore towards an opposite direction until said rotatable locking head disengaged from said second frame member thereby disconnecting said first and second frame members.

17. A device as claimed in claim 16 wherein said first connecting member is substantially in the form of a cylindrical body being snugly received in a transverse housing provided on said first frame member.

18. A device as claimed in claim 16 wherein said first connecting member has an internally threaded portion provided at one end thereof for threadably receiving said set screw.

19. A device as claimed in claim 18 wherein said set screw is retained in said internally threaded portion by a retainer ring being received in an inwardly facing annular groove formed on an inner wall proximate an open end of said first connecting member.

20. A device as claimed in claim 16 wherein said transverse bore of said first connecting member is coaxial with said longitudinal central bore of said first frame member.

* * * * *